No. 830,980. PATENTED SEPT. 11, 1906.
S. B. DUTRO.
DOOR HOLDER.
APPLICATION FILED NOV. 14, 1905.

Witnesses
Inventor
Samuel B. Dutro,
By Victor J. Evans.
Attorney

UNITED STATES PATENT OFFICE.

SAMUEL B. DUTRO, OF MASON CITY, IOWA.

DOOR-HOLDER.

No. 830,980.  Specification of Letters Patent.  Patented Sept. 11, 1906.

Application filed November 14, 1905. Serial No. 287,371.

*To all whom it may concern:*

Be it known that I, SAMUEL B. DUTRO, a citizen of the United States, residing at Mason City, in the county of Cerro Gordo and State of Iowa, have invented new and useful Improvements in Door-Holders, of which the following is a specification.

My invention relates to clamps; and its primary object is to provide a novel and highly useful device of this character by which a door, blind, or the like may be supported in position to permit one of its edges to be planed or fitted with hinges.

The invention consists of the construction, combination, and arrangement of parts hereinafter fully described, claimed, and illustrated in the accompanying drawings, wherein—

Figure 1:
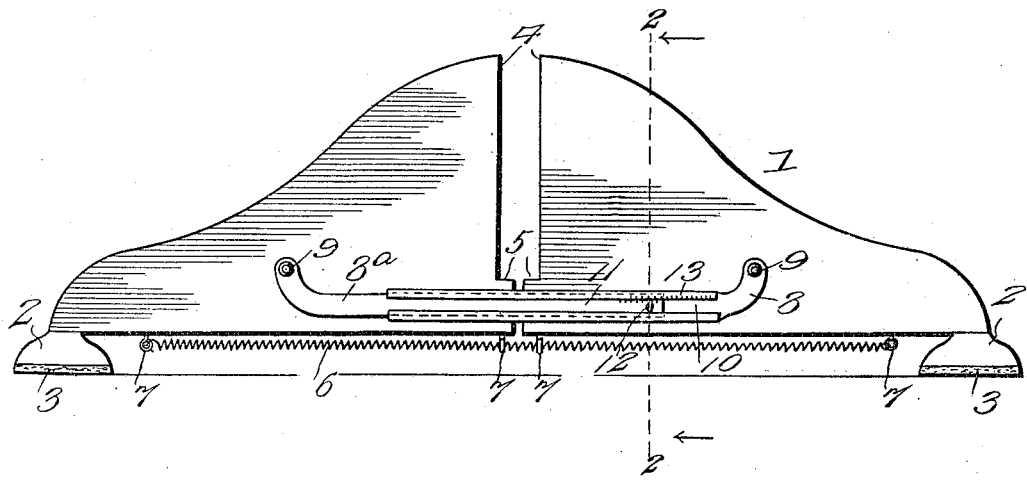
Figure 2:
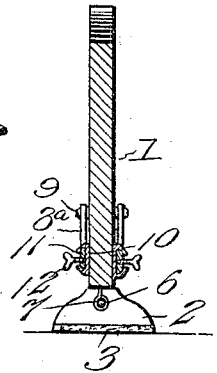

Figure 1 is a view in side elevation of a clamp constructed in accordance with my invention, and Fig. 2 is a sectional view on the line 2 2 of Fig. 1 looking in the direction indicated by the arrows.

The clamp comprises jaws 1 1, which are duplicates in construction and which are adapted to be constructed from wood, metal, or any other suitable material. The jaws are disposed in longitudinal relation to each other and are so connected that their opposing or clamping faces automatically move toward or away from each other by the application or removal of a device to the clamp. The clamp is mounted upon feet or rests 2, which are situated at the outer ends of the jaws 1 1 and which are provided with pads 3. The pads frictionally engage the floor or other support and prevent the clamp from moving while working upon an article supported thereby. The opposing or clamping faces 4 of the jaws are provided at points near their lower extremities with shoulders or offsets 5. The edge of a door or other object is placed upon the shoulders or offsets 5, and the weight thereof causes the opposing or clamping faces of the jaws to approach each other and firmly clamp the object between the jaws. The jaws automatically open when the weight of the object is removed from the shoulders or offsets 5 and are held in this position to permit the ready application or removal of an object to or from the clamp. To cause the jaws to automatically open, a spring 6 is arranged upon their under edges and is secured in position by having its ends attached to the under faces of the jaws at points removed from their opposing or clamping faces. The spring is prevented from sagging downwardly, and thus forming an obstruction, by means of eyes 7, which are secured to the under faces of the jaws and through which the spring is passed.

The jaws are connected together to permit their opposing or clamping faces to automatically move toward and away from each other and to permit them to be relatively adjusted by means of clamps or members 8 and 8ª. The members 8 are provided with longitudinally-disposed dovetail slots 10 to adjustably receive the dovetail portions 11 of the members 8ª. The opposite ends of the members are curved upwardly and pivotally connected to the jaws 1 1 at 9. It is apparent that the members may be adjusted to position the opposing or clamping faces 4 of the jaws 1 1 at such distances apart as to adapt the clamp for the reception of objects of different thicknesses and that the members so connect the jaws that they may be automatically closed and opened. Thumb-screws 12 are carried by the portions 11 to engage the inner walls of the slots 10 to retain the members and jaws in their adjusted positions. The slotted members are provided with graduations 13 to permit the jaws to be adjusted accurately.

The operation of the device may be stated as follows: The jaws having been adjusted properly, the object to be supported by the clamp is inserted between the opposing or clamping faces 4 and positioned upon the shoulders or offsets 5. The application of the object to the shoulders or offsets 5 causes the jaws to approach each other and firmly clamp the object. The object may be removed from the clamp by simply moving the same upward off of the shoulders or offsets 5. When the article has been removed from the shoulders or offsets 5, the spring causes the jaws to turn upon the pivots 9 and move their opposing or clamping faces 4 away from each other, whereby another object may be applied to the clamp.

Having described my invention, what I claim is—

1. A clamp comprising jaws, members pivotally secured to the jaws and adjustably connected to each other, and means for automatically opening the jaws.

2. A clamp comprising jaws, a member pivotally connected to one of the jaws and provided with a longitudinally-arranged slot, another member pivotally connected to the other jaw and adjustably mounted within said slot, means for securing the members in their relative adjusted position, and means to automatically open the jaws.

3. A clamp comprising jaws having their opposing or clamping faces provided with offsets, members pivotally connected to the jaws and adjustably connected to each other, and means for automatically opening the jaws.

In testimony whereof I affix my signature in presence of two witnesses.

SAMUEL B. DUTRO.

Witnesses:
E. J. WILLIAMS,
JOE BARTA.